(12) United States Patent
Hill

(10) Patent No.: US 9,764,967 B1
(45) Date of Patent: Sep. 19, 2017

(54) SANITIZING SYSTEM AND METHOD FOR A SEPTIC SYSTEM

(71) Applicant: Charles E. Hill, Karnack, TX (US)

(72) Inventor: Charles E. Hill, Karnack, TX (US)

(73) Assignee: Charles E. Hill & Associates, Inc., Karnack, TX (US)

( * ) Notice: Subject to any disclaimer, the term of this patent is extended or adjusted under 35 U.S.C. 154(b) by 847 days.

(21) Appl. No.: 13/771,513

(22) Filed: Feb. 20, 2013

(51) Int. Cl.
*C02F 1/76* (2006.01)
*C02F 1/32* (2006.01)

(52) U.S. Cl.
CPC . *C02F 1/32* (2013.01); *C02F 1/76* (2013.01)

(58) Field of Classification Search
CPC .... C02F 1/004; C02F 1/38; C02F 1/76; C02F 1/68; C02F 2209/42; B01D 24/38; B01D 24/12; B01D 35/30
USPC .............. 210/196, 209, 202, 748.01, 748.04, 210/748.11, 748.14; 422/20, 22, 24, 186, 422/186.3; 250/432 R, 502
See application file for complete search history.

(56) References Cited

U.S. PATENT DOCUMENTS

| | | | |
|---|---|---|---|
| 4,895,645 A * | 1/1990 | Zorich, Jr. | C02F 3/006 210/150 |
| 6,296,775 B1 | 10/2001 | Moody et al. | |
| 7,241,380 B2 | 7/2007 | Reiling | |
| 7,279,092 B2 | 10/2007 | Moody et al. | |
| 8,372,274 B2 | 2/2013 | Early et al. | |
| 2002/0046569 A1* | 4/2002 | Faqih | B01D 5/009 62/188 |
| 2003/0024879 A1* | 2/2003 | Carson et al. | 210/638 |
| 2006/0124861 A1* | 6/2006 | Hegmegi | C02F 1/008 250/453.11 |
| 2007/0187329 A1* | 8/2007 | Moller et al. | 210/670 |
| 2010/0025337 A1* | 2/2010 | Yencho | 210/748.1 |
| 2010/0096305 A1* | 4/2010 | Kinasewich | C02F 1/32 210/86 |
| 2010/0326904 A1 | 12/2010 | Lord | |
| 2012/0091050 A1* | 4/2012 | Parkinson et al. | 210/196 |
| 2012/0228117 A1 | 9/2012 | Panunzio | |
| 2013/0020500 A1 | 1/2013 | McKinney | |
| 2013/0020501 A1 | 1/2013 | McKinney | |

* cited by examiner

*Primary Examiner* — Walter D Griffin
*Assistant Examiner* — Cameron Allen
(74) *Attorney, Agent, or Firm* — Faegre Baker Daniels LLP

(57) ABSTRACT

An enhanced septic system includes a storage tank having an inlet that receives liquid gray water from a standard septic system having at least one digester and a pump located in the storage tank. The pump is coupled to an actuator to selectively provide power to the pump from a power supply to pump the gray water from the storage tank when the gray water reaches a predetermined level within the storage tank. The system also includes an outlet pipe coupled to the storage tank and to receive gray water pumped from the storage tank by the pump, at least one ultraviolet light in communication with the outlet pipe, and a detector to determine when the pump is actuated and to turn on the at least one ultraviolet light upon actuation of the pump.

8 Claims, 2 Drawing Sheets

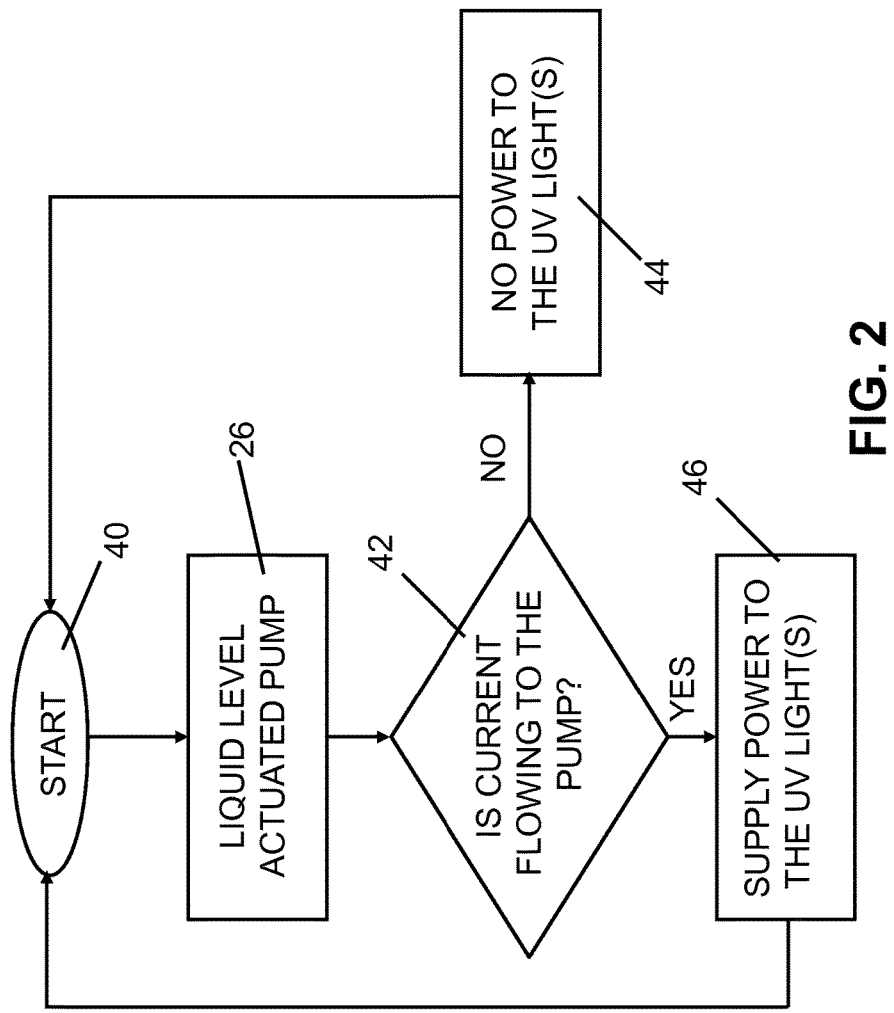

SANITIZING SYSTEM AND METHOD FOR A SEPTIC SYSTEM

BACKGROUND AND SUMMARY

The present disclosure relates to an improved septic system. More particularly, the present disclosure relates to an apparatus and method for sanitizing effluent discharged from a septic system.

Municipalities have used ultraviolet (UV) lights to destroy bacteria and viruses in municipal water systems for several years. In drinking water systems, the UV lights may replace the chlorine that is commonly used to treat the water. For example, Orange County, Calif. uses UV technology as the final purification of their wastewater purification project. The output of this system is deemed pure enough to allow it to be injected into the aquifer from which they acquire the drinking water for their water system.

Another common application for UV light purification is for aquariums and ornamental ponds. In these applications, the water is circulated through a UV light purification system to remove bacteria, viruses and algae.

In all of the above-cited examples, the applications are treating very large amounts of water. The circulation pumps and the UV lights are continuously operated as there is always a demand for processing water.

Gray water exiting a conventional septic system of a home and business is typically distributed to the earth through a drain field or leach bed. The earth, through an absorption process, destroys the bacteria and viruses contained in the gray water. Where homes and businesses are built in flood plain areas, such as near lakes and rivers, conventional septic systems are compromised each time the area floods. When flooding occurs, there is no leaching action and the bacteria and viruses are washed directly into the surface water.

Where surface area is required to build a leach bed to destroy the bacteria and viruses or the injection of chlorine is used to destroy the bacteria and viruses contained in the gray water, a UV light purification system of the present disclosure could be used instead. After treatment with the UV light sanitizing system of the present disclosure, the purified gray water may be acceptable to be released into a storm sewer system.

In the business and residential septic system applications, the demand for purification only occurs when a toilet is flushed, a shower is used, a sink is used, or any other activities occur that create wastewater. The demand occurs if the activity causes a storage tank to reach an effluent level that causes a pump in the storage tank to be actuated.

In one illustrated embodiment of the present disclosure, an enhanced septic system includes a storage tank having an inlet that receives liquid gray water from a standard septic system having at least one digester and a pump located in the storage tank. The pump is coupled to an actuator to selectively provide power to the pump from a power supply to pump the gray water from the storage tank when the gray water reaches a predetermined level within the storage tank. The system also includes an outlet pipe coupled to the storage tank and to receive gray water pumped from the storage tank by the pump, at least one ultraviolet light in communication with the outlet pipe, and a detector to determine when the pump is actuated and to turn on the at least one ultraviolet light upon actuation of the pump.

In one illustrated embodiment, the detector is a current sensing switch configured to sense current flow from the power supply to the pump. The current sensing switch closes a switch to provide power from the power supply to the at least one ultraviolet light when current flow to the pump is detected. The current sensing switch is open to turn off the at least one ultraviolet light when no current is flowing from the power supply to the pump.

In another illustrated embodiment of the present disclosure, a method is provided for handling gray water from a standard septic system with at least one digester. The method includes storing the gray water in a storage tank, pumping gray water from the storage tank through an outlet pipe with a pump when the gray water level in the storage tank reaches a predetermined level, turning on at least one ultraviolet light to expose the gray water within the outlet pipe to ultraviolet light during the pumping step, and turning off the at least one ultraviolet light upon completion of the pumping step.

In an illustrated embodiment, the method also includes determining when the pump is actuated to pump gray water from the storage tank through the outlet pipe during the pumping step. The step of turning on at least one ultraviolet light to expose the gray water within the outlet pipe to ultraviolet light occurs upon detecting that the pump has been actuated. In one illustrated embodiment, the determining step includes detecting a current flowing from a power supply to the pump. In this embodiment, power is supplied to turn on the at least one ultraviolet light when current flow to the pump is detected.

The above-mentioned and other features of this invention, and the manner of attaining them, will become more apparent and the invention itself will be better understood by reference to the following description of illustrated embodiments of the invention taken in conjunction with the accompanying drawings.

BRIEF DESCRIPTION OF THE DRAWINGS

The above-mentioned and other features of this invention, and the manner of attaining them, will become more apparent and the invention itself will be better understood by reference to the following description of illustrative embodiments taken in conjunction with the accompanying drawings, wherein:

FIG. 2 is a flow chart illustrating operation of the sanitizing system of FIG. 1.

DETAILED DESCRIPTION OF THE DRAWINGS

Figure 1:
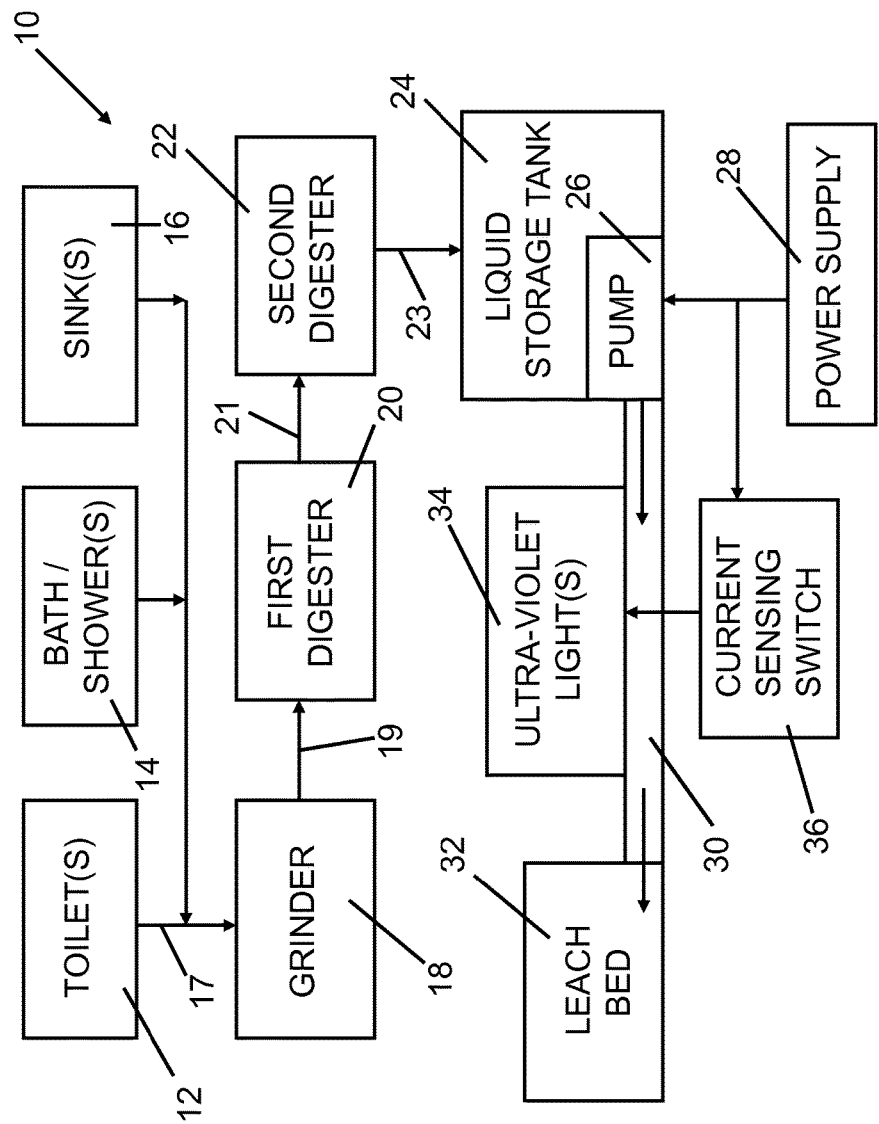
FIG. 1 is a block diagram of an ultraviolet (UV) light sanitizing system for a septic system according to an illustrative embodiment of the present disclosure.

For the purposes of promoting an understanding of the principles of the invention, reference will now be made to certain illustrated embodiments and specific language will be used to describe the same. It will nevertheless be understood that no limitation of the scope of the invention is thereby intended. Such alterations and further modifications of the invention, and such further applications of the principles of the invention, as described herein as would normally occur to one skilled in the art to which the invention pertains, are contemplated, and desired to be protected.

Referring now to the drawings, FIG. 1 illustrates a septic system 10 designed for use at residential or business locations. The septic system 10 processes wastewater and sewage or effluent from toilets 12, baths or showers 14, sinks 16, or other drains within a facility or building. The outlets from toilets 12, baths and showers 14, and sinks 16 are coupled to a grinder 18 by a supply pipe 17. Washing machines or other effluent producing sources may also be coupled to the grinder inlet 17. Grinder 18 illustratively includes a pump and cutting blade. The pump of grinder 18 is capable of pumping effluent from the grinder 18 upwardly through an outlet pipe 19. Therefore, the grinder 18 may be located below the level of a sewer line, if desired. In an illustrative embodiment, grinder 18 is a Sanigrind® grinder available from SFA Saniflo USA.

Grinder 18 reduces the size of material in the waste effluent so that the waste effluent is discharged through a ¾" pipe 19 to the first digester 20 of the septic system 10. This grinding operation creates a much more digestible solution for the bacteria in the first digester 20. The grinder 18 also has a pumping action that allows the waste from the facility to be raised from a lower level to a higher level. Therefore, the septic system 10 could be at a higher elevation than the waste creating devices 12, 14, 16 in the building.

An output from grinder 18 passes through pipe 19 to a first digester 20. The digester 20 of septic system 10 is the place where bacteria reduce the effluent into gray water. A baffle system at the output of the digester 20 restricts the size of a solid capable of exiting the digester 20 to the next stage. In the illustrative embodiment, the output from the first digester 20 passes to an inlet of a second digester 22 through pipe 21. This second digester 22 provides another area where bacterial action further reduces solids into gray water.

An outlet from the second digester 22 passes through a pipe 23 to an inlet of a liquid storage tank 24. Tank 24 includes an internal pump 26. In an illustrative embodiment, the pump 26 is a level actuated pump which receives power from a power supply 28. When the liquid level in tank 24 reaches a predetermined level, a float switch or other level activation switch inside tank 24 turns on the pump 26 to remove effluent from the tank 24. Therefore, pump 26 is actuated only when necessary. When pump 26 is activated by the level sensor, pump 26 pumps the effluent from tank 24 through an outlet pipe 30 to a leach bed 32 passing over one or more ultraviolet (UV) lights 34.

The least expensive pumps available for pumping gray water are a combination of a pump with an integral float switch which causes the pump to turn on when a predetermined level of the liquid is reached. These pumps are inexpensive as they are considered general-purpose pumps and are manufactured in large quantities. Because the pump and float switch are all contained within a unit that can be totally submerged, it would require breaking the seal of the unit and its integrity to gain access to the switch. Without access to the switch or other means of detecting when the pump is actually running, a sanitizing system would be required to leave the sanitizing UV light(s) on continuously.

One or more ultraviolet (UV) lights 34 are located within the outlet pipe 30 to kill bacteria, viruses and algae as the effluent (gray water) passes from tank 24 passes through the outlet pipe 30 to the leach bed 32. The system 10 of the present disclosure includes a current sensing switch 36 for controlling operation of the UV lights 34. In an illustrative embodiment, current sensing switch 36 senses current flowing from power supply 28 to pump 26 and then closes a switch to supply power from the power supply 28 to the UV lights 34. Therefore, the UV lights 34 are powered on only when the pump 26 is running. The system 10 substantially reduces the amount of time that the UV lights 34 are powered on.

FIG. 2 illustrates operation of the current sensing switch 36. Operation starts at block 40. As discussed above, the liquid level actuated pump 26 located in tank 24 only receives power from power supply 28 when the level in tank 24 exceeds a predetermined level. Current sensing switch 36 detects whether or not current is flowing to the pump 26 as illustrated at block 42. If not, no power is supplied to the UV lights 24 as illustrated at block 44. If current is flowing to the pump 26 at block 42, power is supplied to the UV lights 34 as illustrated at block 46.

The UV light(s) 34 are designed to have water passing in close proximity to them at all times. If the pump 26 fails to turn on and the UV lights 34 are turned on, the longevity of the UV lights 34 would be compromised as they would be operating continuously without the cooling benefit of the water passing over their surfaces. In addition, power is wasted if the UV lights 34 are on when no effluent is flowing through pipe 30.

By installing a current-sensing switch on a power lead of the pump 26, the UV lights 34 of the present disclosure are turned on in response to actuation of the pump 26. Therefore, the UV lights 34 are only on when pumping is occurring. This is a failsafe design. For a home that uses 3000 gallons of water per month, this would reduce the time the UV lights 34 are on by approximately 99% assuming a 500 gallon/hour pumping rate.

Other failsafe embodiments of the present disclosure include the use of a pressure-sensing or flow-sensing switch located within tube 30 to sense flow of effluent from tank 24 and to turn on the UV lights 34. If either of these implementations is used, however, an inherent delay occurs between the time the pump is turned on and the time flow actually occurs will be lost. A predetermined time is needed after activation of the UV lights before the UV lights reach full intensity. The current sensing switch 36 provides a delay between time when the UV lights are turned on and the time flow starts in order to permit the UV lights to reach full intensity before flow starts. Therefore, the current sensing switch 36 of FIG. 1 is the preferred embodiment.

Each manufacturer of UV light systems 34 provides a specification of flow rates that provides maximum elimination of bacteria, viruses, and any other pathogen that is killed by the UV lights 34. Pump manufacturers also provide maximum flow rates for each of their pumps 26. Yet another variable is the type and size of plumbing 30 that connects the pump 26 to the UV light system 34. To provide a flow rate of gray water to the UV light system 34 that maximizes the elimination of bacteria and viruses requires some experimentation. Providing an adjustable flow from the pump 26 through the outlet 30 and the UV light system 34 facilitates achieving a reliable system. In one illustrated embodiment, an adjustable bypass is provided in the pumping system. For example, a Y is provided in the plumbing of the pump output pipe 30. One output goes to the UV light system 34 and the other output directs effluent back to the gray water storage tank 24. An adjustable valve is inserted into either output to restrict the output flow to the UV light system 34. The output of sprinkler head(s) in the leach bed 32 may be tested for the presence of bacteria and viruses as well as for rate of flow. No bacteria or viruses should be detected and the flow rate should be sufficient to keep the gray water storage tank 24 from overflowing under normal facility operation.

While the invention has been illustrated and described in detail in the drawings and foregoing description, the description is to be considered as illustrative and not restrictive in character. Only the illustrated embodiments, and such alternative embodiments deemed helpful in further illuminating the illustrated embodiments, have been shown and described. Therefore, variations and modifications exist within the scope and spirit of the present invention as defined in the following claims.

What is claimed is:

1. A method for handling gray water from a standard septic system with at least one digester comprising:
   storing the gray water in a storage tank;
   determining when a gray water level in the storage tank has reached a predetermined level;
   pumping gray water from the storage tank through an outlet pipe with a pump when the gray water level in the storage tank reaches the predetermined level;
   determining when the pump is actuated to pump gray water from the storage tank through the outlet pipe during the pumping step using a current sensing switch coupled to a power lead of the pump;
   turning on at least one ultraviolet light to expose the gray water within the outlet pipe to ultraviolet light during the pumping step upon the current sensing switch indicating that the pump has been actuated to pump gray water from the storage tank; and
   turning off the at least one ultraviolet light upon completion of the pumping step.

2. The method of claim 1, further comprising supplying the gray water treated with the at least one ultraviolet light from the outlet pipe to a leach bed.

3. The method of claim 1, further comprising grinding an effluent from an effluent receiving source before storing the effluent in the at least one digester.

4. The method of claim 1, wherein the turning on of the at least one ultraviolet light step occurs immediately upon determining the pump has been actuated to pump gray water from the storage tank.

5. The method of claim 1, wherein the predetermined level is determined by a level activation switch.

6. The method of claim 1, wherein the pump is actuated prior to gray water flowing through the outlet pipe.

7. The method of claim 1, wherein a baffle system is provided to restrict the size of a solid capable of entering the at least one digester.

8. The method of claim 1 further comprising adjusting a flow rate of gray water from the pump through the outlet pipe to increase an efficiency of the at least one ultraviolet light in reducing bacteria, viruses, and algae within the gray water as the gray water passes through the outlet pipe.

* * * * *